(No Model.)

G. CROUCH.
CLASP FOR POCKET BOOKS, &c.

No. 276,362. Patented Apr. 24, 1883.

WITNESSES
J. B. Connolly
Will H. Powell

INVENTOR
George Crouch
by
Connolly Bros.
ATTORNEYS

UNITED STATES PATENT OFFICE.

GEORGE CROUCH, OF NEW YORK, N. Y.

CLASP FOR POCKET-BOOKS, &c.

SPECIFICATION forming part of Letters Patent No. 276,362, dated April 24, 1883.

Application filed February 13, 1883. (No model.)

*To all whom it may concern:*

Be it known that I, GEORGE CROUCH, a citizen of the United States, residing at New York, in the county of New York and State of New York, have invented certain new and useful Improvements in Fastenings for Bag-Pockets, Pocket-Books, &c.; and I do hereby declare the following to be a full, clear, and exact description of the invention, reference being had to the accompanying drawings, which form part of this specification, in which—

Figure 1:
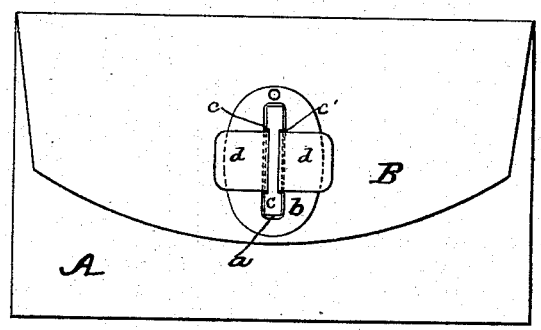
Figure 2:
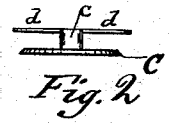
Figure 4:
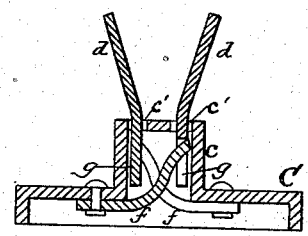
Figure 3:
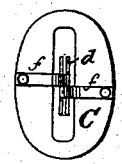
Figure 5:
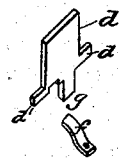

Figure 1 is a plan view, showing the fastening in operation. Fig. 2 is an end view of the fastening. Fig. 3 is a bottom view of the same; Fig. 4, a transverse section, and Fig. 5 a detail perspective.

My invention relates to a fastening for bag-pockets, hand-bags, pocket-books, &c., and has for its object the provision of a fastening of novel form and simple construction, easy of operation, and not liable to get out of order or to become unfastened accidentally.

My invention consists in a base-plate attached to the bag or other article to be fastened, and having a raised central portion from which project pivoted leaves that pass through and are turned down over an eye or opening formed in or attached in any suitable manner to the flap of the bag, said leaves being retained in an open or closed position by suitable springs attached to and contained within the base-plate.

Referring to the accompanying drawings, A represents the bag or other object to which the fastening is attached, and B the flap of the bag, which has an opening, $a$, for the reception of the fastening, and a guard-plate, $b$, surrounding said opening.

C is the base-plate of the fastening device, secured to the bag A by rivets or other suitable means. The plate C has a rectangular stud, $c$, formed on or attached to its upper side, of a height sufficient to retain the flap B and project slightly beyond the face of the plate $b$. The stud $c$ has two slots, $c'$ $c'$, in its top, through which project hinged or pivoted leaves $d$ $d$, which have at each of their lower corners a laterally-projecting pin, $d'$ $d'$. Said pins serve to prevent the leaves from passing entirely through the slots, and act as pivotal points for the leaves.

To the bottom of the base-plate A, on each side, is attached a flat spring, $f$, whose free end is bent up into the interior of the stud $c$, and rests on the lower edge of the pivoted leaf $d$ on the opposite side, thus serving to hold the leaf up in the slot. The leaves $d$ $d$ have each a lug, $g$, on their lower edges, which, when the leaves are being turned over, strikes against the upper side of the springs $f$ and forces the same outward, the tension of the springs acting to close the leaves with a snap at the end of their movement in either direction.

The operation of my invention is as follows: The leaves $d$ $d$ being turned up into a vertical position with relation to the base-plate A, the flap B is laid down over the fastening, the stud $c$ projecting through the opening in the flap. The leaves $d$ $d$ are then turned over to either side and pressed down upon the guard-plate $b$. The leaves are kept in position by the pressure of the springs $f$ $f$, and the fastening is secure, neat, and easy to operate.

While I have described my invention as being applicable to pocket-books, &c., I do not desire to limit myself to such application, as my fastening is well adapted for use in any position where a fastening is desired to take the place of a button or hook and eye.

What I claim is—

1. A fastening consisting of a base-plate having a hollow central stud slotted for the reception of pivoted leaves which are held, either open or closed, in position by springs secured to the bottom of said base-plate and operating within the stud, substantially as and for the purpose described.

2. The combination of base-plate C, having stud $c$, slotted as shown, with pivoted leaves $d$ $d$ and springs $f$ $f$, substantially as described.

3. The combination of base-plate C, stud $c$, slots $c'$ $c'$, leaves $d$ $d$, having pins $d'$ $d'$, and lugs $g$, with springs $f$ $f$, secured to the base-plate and engaging with the lugs $g$, substantially as shown and described.

In testimony that I claim the foregoing I have hereunto set my hand this 6th day of February, 1883.

GEORGE CROUCH.

Witnesses:
WM. G. CONKLIN,
R. D. SMITH.